(12) United States Patent
Duran

(10) Patent No.: US 9,824,006 B2
(45) Date of Patent: Nov. 21, 2017

(54) APPARATUS AND SYSTEM FOR OBJECT-BASED STORAGE SOLID-STATE DEVICE

(71) Applicant: Paul A. Duran, San Diego, CA (US)

(72) Inventor: Paul A. Duran, San Diego, CA (US)

(73) Assignee: Digital Kiva, Inc., San Diego, CA (US)

( * ) Notice: Subject to any disclaimer, the term of this patent is extended or adjusted under 35 U.S.C. 154(b) by 426 days.

(21) Appl. No.: 13/775,216

(22) Filed: Mar. 2, 2013

(65) Prior Publication Data

US 2014/0250256 A1 Sep. 4, 2014

Related U.S. Application Data

(63) Continuation of application No. 13/118,418, filed on May 28, 2011, now Pat. No. 8,402,152, which is a continuation of application No. 12/319,096, filed on Dec. 31, 2008, now Pat. No. 7,970,919, which is a continuation-in-part of application No. 11/891,741, filed on Aug. 13, 2007.

(60) Provisional application No. 61/891,899, filed on Jan. 22, 2008.

(51) Int. Cl.
  *G06F 12/00* (2006.01)
  *G06F 12/02* (2006.01)
  *G06F 3/06* (2006.01)

(52) U.S. Cl.
  CPC ........ *G06F 12/0246* (2013.01); *G06F 3/0605* (2013.01); *G06F 3/0659* (2013.01); *G06F 3/0688* (2013.01); *G06F 2212/7211* (2013.01)

(58) Field of Classification Search
  CPC ............... G06F 12/0246; G06F 3/0659; G06F 2212/7211; G06F 3/0605; G06F 3/0688
  USPC ......................................................... 711/103
  See application file for complete search history.

(56) References Cited

U.S. PATENT DOCUMENTS

| | | |
|---|---|---|
| 6,823,398 B1 | 11/2004 | Lee et al. ........................... 710/5 |
| 6,950,876 B2 | 9/2005 | Bright et al. .................. 709/230 |
| 7,366,808 B2 | 4/2008 | Kano et al. .................... 710/105 |
| 7,398,348 B2 | 7/2008 | Moore et al. ................. 711/103 |
| 7,503,065 B1 | 3/2009 | Packingham et al. |
| 7,640,424 B2 | 12/2009 | Conley .............................. 713/1 |
| 7,783,956 B2 | 8/2010 | Ko et al. ........................ 714/763 |

(Continued)

OTHER PUBLICATIONS

Nathan Kirsch, Crucial Releases 040H Firmware for m4 SSD Series, Dec. 21, 2012, p. 1 of Legit Reviews as found in Paril 2015 at http://www.legitreviews.com/crucial-releases-040h-firmware-for-m4-ssd-series__14758.*

(Continued)

*Primary Examiner* — Matthew Bradley

(57) ABSTRACT

An object-based storage system comprising a host system capable of executing applications for and with an object-based storage device (OSD). Exemplary configurations include a call interface, a physical layer interface, an object-based storage solid-state device (OSD-SSD), and are further characterized by the presence of a storage processor capable of processing object-based storage device algorithms interleaved with processing of physical storage device management. Embodiments include a storage controller capable of executing recognition, classification and tagging of application files, especially including image, music, and other media. Also disclosed are methods for initializing and configuring an OSD-SSD device.

34 Claims, 11 Drawing Sheets

(56) References Cited

U.S. PATENT DOCUMENTS

| | | | |
|---|---|---|---|
| 8,898,548 B1 * | 11/2014 | Mullendore | H03M 13/353 365/185.09 |
| 2001/0007120 A1 | 7/2001 | Makita | 711/112 |
| 2003/0061388 A1 | 3/2003 | Cleghorn et al. | 709/246 |
| 2004/0111522 A1 | 6/2004 | Johnson et al. | 709/230 |
| 2005/0240713 A1 | 10/2005 | Wu et al. | 710/314 |
| 2005/0281095 A1 | 12/2005 | Eilert et al. | 365/189.12 |
| 2006/0156059 A1 | 7/2006 | Kitamura | 714/6 |
| 2006/0161749 A1 * | 7/2006 | Chen et al. | 711/164 |
| 2006/0256623 A1 | 11/2006 | Roohparvar | 365/185.29 |
| 2007/0016702 A1 | 1/2007 | Pione et al. | 710/62 |
| 2007/0073937 A1 | 3/2007 | Feinberg et al. | 710/62 |
| 2007/0079030 A1 | 4/2007 | Okuley et al. | 710/62 |
| 2007/0118632 A1 | 5/2007 | Harvey et al. | 709/223 |
| 2007/0150887 A1 | 6/2007 | Shapiro | 717/174 |
| 2007/0156952 A1 | 7/2007 | Monigan | 711/112 |
| 2008/0022120 A1 | 1/2008 | Factor et al. | 713/184 |
| 2008/0098164 A1 | 4/2008 | Lee et al. | 711/103 |
| 2009/0019098 A1 | 1/2009 | Gunda et al. | 707/205 |
| 2009/0172253 A1 | 7/2009 | Rothman et al. | 711/103 |
| 2009/0204872 A1 | 8/2009 | Yu et al. | 714/773 |
| 2009/0265508 A1 | 10/2009 | Bennett et al. | 711/103 |
| 2010/0023672 A1 | 1/2010 | Gorobets et al. | 711/103 |
| 2010/0023682 A1 | 1/2010 | Lee et al. | 711/103 |

OTHER PUBLICATIONS

USPTO Office Action for U.S. Appl. No. 11/891,741 dated Dec. 9, 2008.

USPTO Office Action for U.S. Appl. No. 12/319,056 dated Aug. 31, 2010.

General Description of a Pay TV System, www.WirelessCommunication.NL, Chapter 1, Network Concepts and Standards; Gerhard C. Langelaar (Author) and Jean-Paul Linnartz (Editor), Jan. 1999, 4 pages.

Functional Model of a Conditional Access System, Chapter 1, Introduction; EBU Technical Review, Winter 1995, pp. 64-77.

USPTO Notice of Allowability for U.S. Appl. No. 13/118,418 dated Dec. 21, 2012.

USPTO Notice of Allowance for U.S. Appl. No. 13/319,096 dated Mar. 18, 2011.

* cited by examiner

APPARATUS AND SYSTEM FOR OBJECT-BASED STORAGE SOLID-STATE DEVICE

CLAIM OF PRIORITY

This application is a continuation of U.S. Ser. No. 13/118,418 filed May 28, 2011 by Paul A. Duran (now U.S. Pat. No. 8,402,152), which is a continuation of U.S. Ser. No. 12/319,096 filed Dec. 31, 2008 by Paul A. Duran (now U.S. Pat. No. 7,970,919), which claims priority from Provisional Application U.S. Ser. No. 61/011,899, filed Jan. 22, 2008 (now expired), and which is a continuation-in-part of U.S. Ser. No. 11/891,741 filed Aug. 13, 2007 by Paul A. Duran (now abandoned), all incorporated in entirety herein by reference and all priorities claimed.

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to object-based storage devices (OSDs), and more particularly to object-based storage systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In various conventional storage systems, rotating magnetic media is used. While the density of such rotating media has increased with demand for storage, the mere fact that the system has mechanically moving parts makes the system inherently subject to reliability problems, and inherently slow, slow, at least relative to the speed of moving electrons. Conventional approaches to mitigating the inherent limitations of rotating storage media have included the creation of arrays of redundant independent disks (RAID). Many advances in RAID-related technologies have resulted in a well understood corpus of techniques for RAID that address reliability and speed.

Concurrent with advances in storage subsystems, are advances in the taxonomy of stored items. Whereas traditionally a stored item is viewed by the operating system as just a sequence of blocks of binary data, prescient operating system design considers stored objects as having many more attributes than merely a sequence of blocks of binary data. Of course with a more specific taxonomy of stored items comes additional capabilities (and speed requirements) for the operating system to pre-process data before presenting to a user or to an application. Commercially viable solid-state memory systems based on DRAM, while much faster than rotating media, exhibit another set of limitations, including (depending on the specific technology or techniques employed) volatility and cost.

Meanwhile, trends in manufacturing of certain solid-state memory devices portend higher densities, inherently higher reliability, and higher speeds, while delivering functionality at lower power and lower costs such as NAND flash memory. However, commercially available consumer grade external storage devices have limited storage host attach interfaces (e.g. USB or 1394), and controllers that are typically included with FLASH devices are only very modest in capability.

Even given the viable storage technologies, access and transfer speeds are still far slower than users accept when the aforementioned pre-processing techniques are employed. Moreover in many commercial embodiments, multiple interfaces (especially interfaces of differing types) are preferred.

These and other limitations foster the notion to combine the concepts of object-based storage techniques with high-performance solid-state based storage. Consideration of object-based storage algorithms executing on storage host attach interfaces, together with solid-state memory systems, results in an avalanche of ideas and inventions which are the subject matter of the detailed descriptions of embodiments herein.

SUMMARY

The invention provides for a storage physical interface and is characterized by a control module capable of processing object storage device algorithms. The storage physical interface is characterized by a control module capable of processing object storage device algorithms and is further characterized by including at least one solid-state non-volatile memory chip array.

In accordance with embodiments, there are provided techniques for providing multiple interfaces in a solid-state based storage system employing OSD techniques. Embodiments include providing for multiple interfaces in a solid-state device (SSD) storage system within a freestanding storage cabinet, or in a desk side chassis, or in an industry-standard drawer-type form factor, or in a consumer device (e.g. digitial camera, smartphone, handheld game console), or even in miniaturized or custom form factors.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for an apparatus for providing a solid-state based storage device with multiple interfaces. Apparatus and methods are disclosed herein, with emphasis on disclosure of embodiments to provide features related to a solid-state based storage device with multiple interfaces and techniques to enable additional enhanced services in conjunction with the traditional use of a storage device. In accordance with embodiments, there are provided techniques for providing multiple interfaces in a solid-state based storage system employing OSD techniques. Embodiments include providing for a solid-state device (SSD) storage system within a freestanding storage cabinet, or in a desk side chassis, or in an industry-standard drawer-type form factor, or in a consumer device (e.g. digitial camera, smartphone, handheld game console), or even in miniaturized or custom form factors.

Figure 1A:
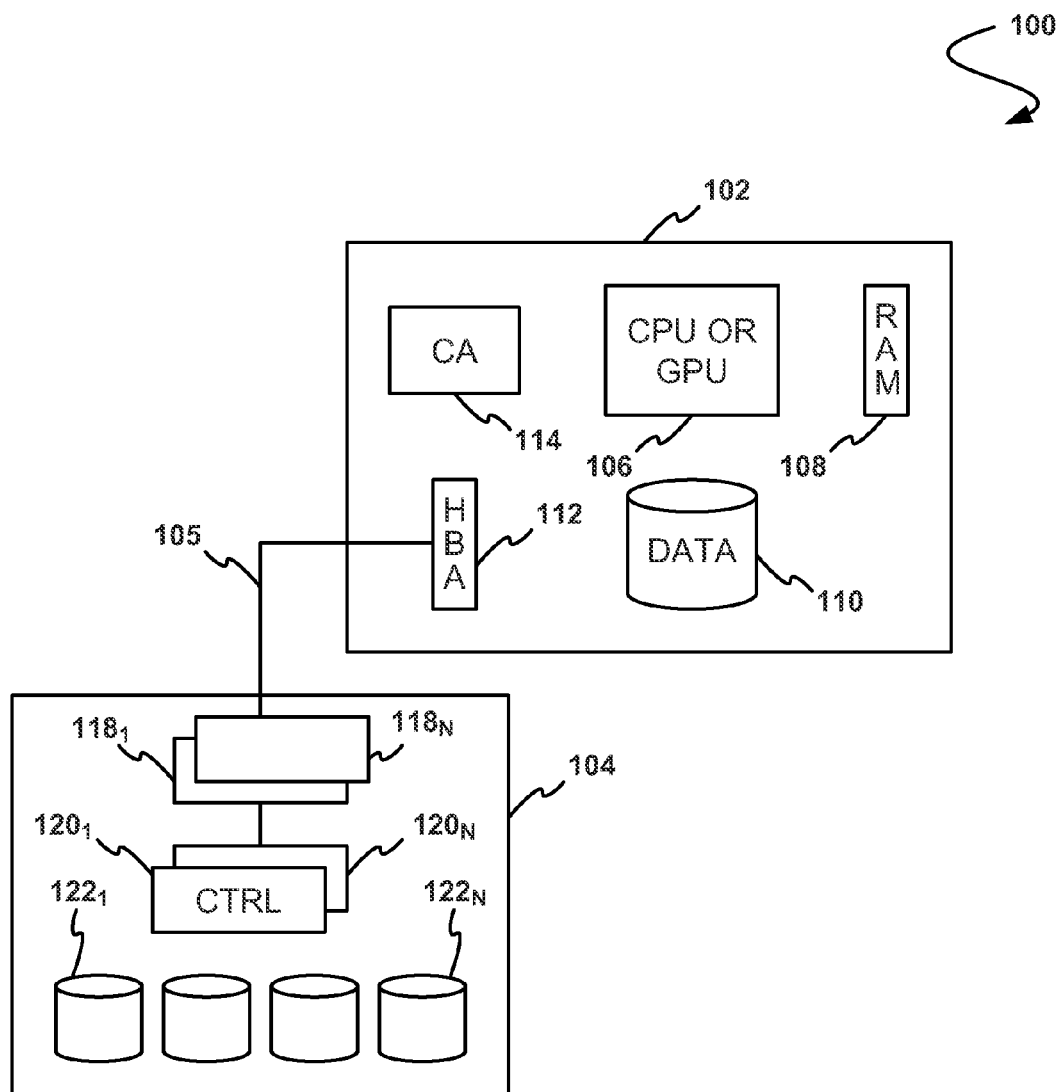
FIG. 1A illustrates a block diagram of an environment where an apparatus for providing a solid-state based storage device with multiple interfaces might be used, according to one embodiment.

FIG. 1A illustrates a block diagram of an environment where an apparatus for providing a solid-state based storage device with multiple interfaces might be used. In particular, FIG. 1A depicts a computer system 102 (e.g. desktop personal computer, desk side personal computer, server, DVR, NVR, PVR, media server, game console such as an Xbox™ or Wii™, entertainment center, or any other consumer device employing non-volatile memory, digitial camera, smartphone, handheld game console, mobile handheld device, etc) connected to a solid-state based storage device 104 through at least one interface in operation through connection 105. Strictly as an option, the solid-state based storage device 104 may feature multiple solid-state disk drives $122_1$ through $122_N$. Embodiments of the solid-state based storage device 104 may include multiple interfaces $118_1$ through $118_N$, capable to serve at least two distinct input-output interface types. Embodiments of the solid-state based storage device 104 may include multiple controllers $120_1$ through $120_N$. The computer system may include a CPU or GPU 106, and may further include random access memory 108, provided as internal or external random access memory or both. In some embodiments, the computer system 102 may contain a local hard disk drive (HDD) storage. As an optional feature, the computer system 102 may contain a host bus adapter 112 and a client agent 114. As will be described in the following, the host bus adapter may be as simple as a physical layer interface, or it may be more complex, involving both firmware and software, or any degree of complexity or simplicity. Similarly, the client agent 114 may be implemented in or on any element included in the computer system 102 that is capable of executing software or firmware. In this exemplary environment, the components 102 and 104 each include firmware or software or both as is presently described.

Figure 1B:
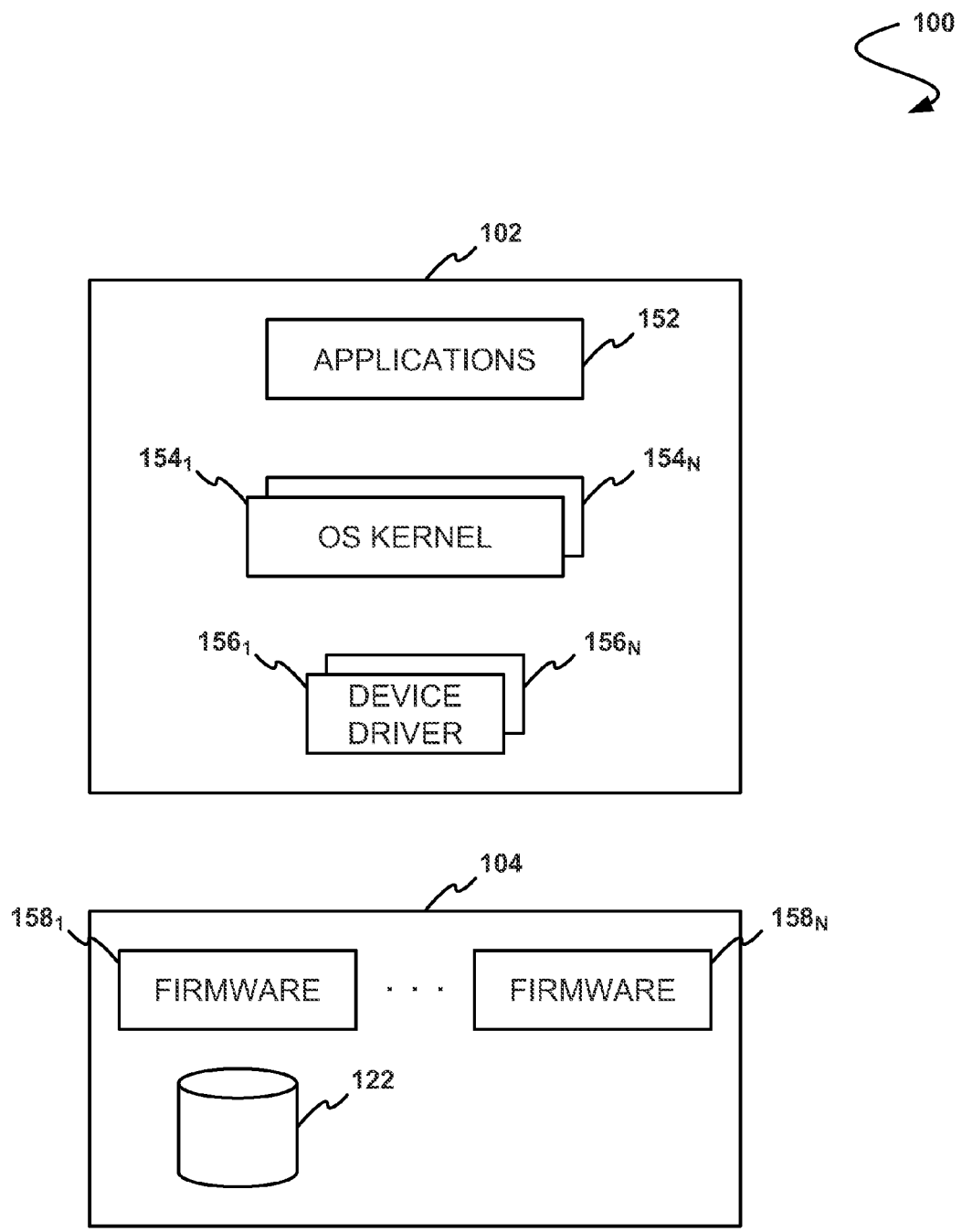
FIG. 1B illustrates a block diagram of a software stack for providing a solid-state based storage array with multiple interfaces, according to one embodiment.

FIG. 1B depicts a block diagram of a software stack. Strictly as an option in some embodiments, software applications 152 execute on computer system 102 possibly using any services as may be provided by one or more operating system (OS) kernels $154_1$-$154_N$. The OS kernel, in turn may use any services as may be provided by the drivers $156_1$ through $156_N$.

In addition to the aforementioned software stack components 152, 154, and 156, the solid-state based storage device with multiple interfaces 104 may itself include a collection of software or firmware, which may be organized into multiple images or multiple instances as depicted in elements $158_1$ through $158_N$. Additionally, there may be firmware or software or even an entire stack of software embedded in, or executing on, or adapted to execute on or in or with the one or more solid-state disk drives 122.

Figure 2:
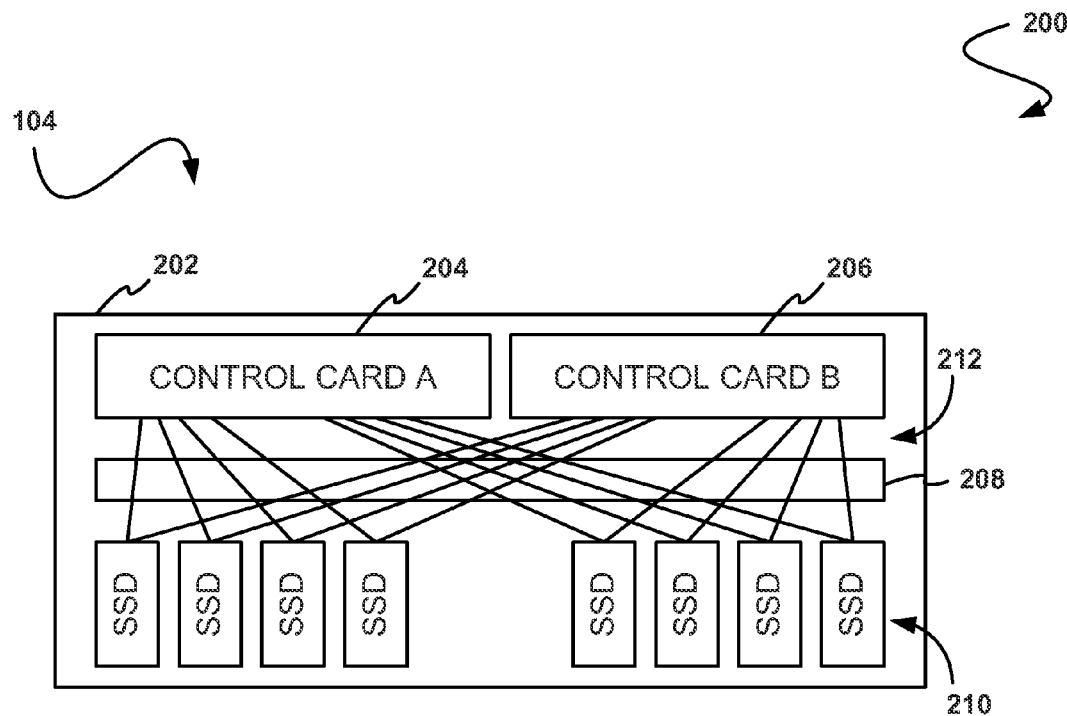
FIG. 2 illustrates a block diagram of an embodiment of a solid-state based storage device.

FIG. 2 shows an example embodiment of a solid-state based storage device 104 as shown in FIG. 1, and similarly again in the embodiment of FIG. 2. In the method 200, the embodiment includes a carrier or chassis 202 which may be a physical chassis, or a motherboard, or a daughter-card or any other printed circuit board (PCB). The chassis 202 serves to orient and connect one or more controllers 204, 206 to an array of solid-state based storage devices 210. In some embodiments, there may be a plurality of controllers 204, 206 configured to provide enhanced reliability. As one skilled in the art will readily recognize, the techniques and capabilities employed in a RAID array of spinning drive elements can be similarly employed in the situation where solid-state based storage devices are employed as RAID elements of RAID sets. In the example shown, a controller 204 is in communication with every element in the array of solid-state based storage devices 210. Also as shown, strictly as an option to provide redundancy, a second or nth controller 206 is in communication with every element in the array of solid-state based storage devices 210. The solid-state based storage devices 210 may be implemented by using one or more types of solid-state based storage devices, including flash-based SSDs (whether NAND or other flash technology), or other solid-state based storage devices, or whether or not the SSDs include a SATA, or SATA2, or SAS, or IDE, or other interface.

Figure 3:
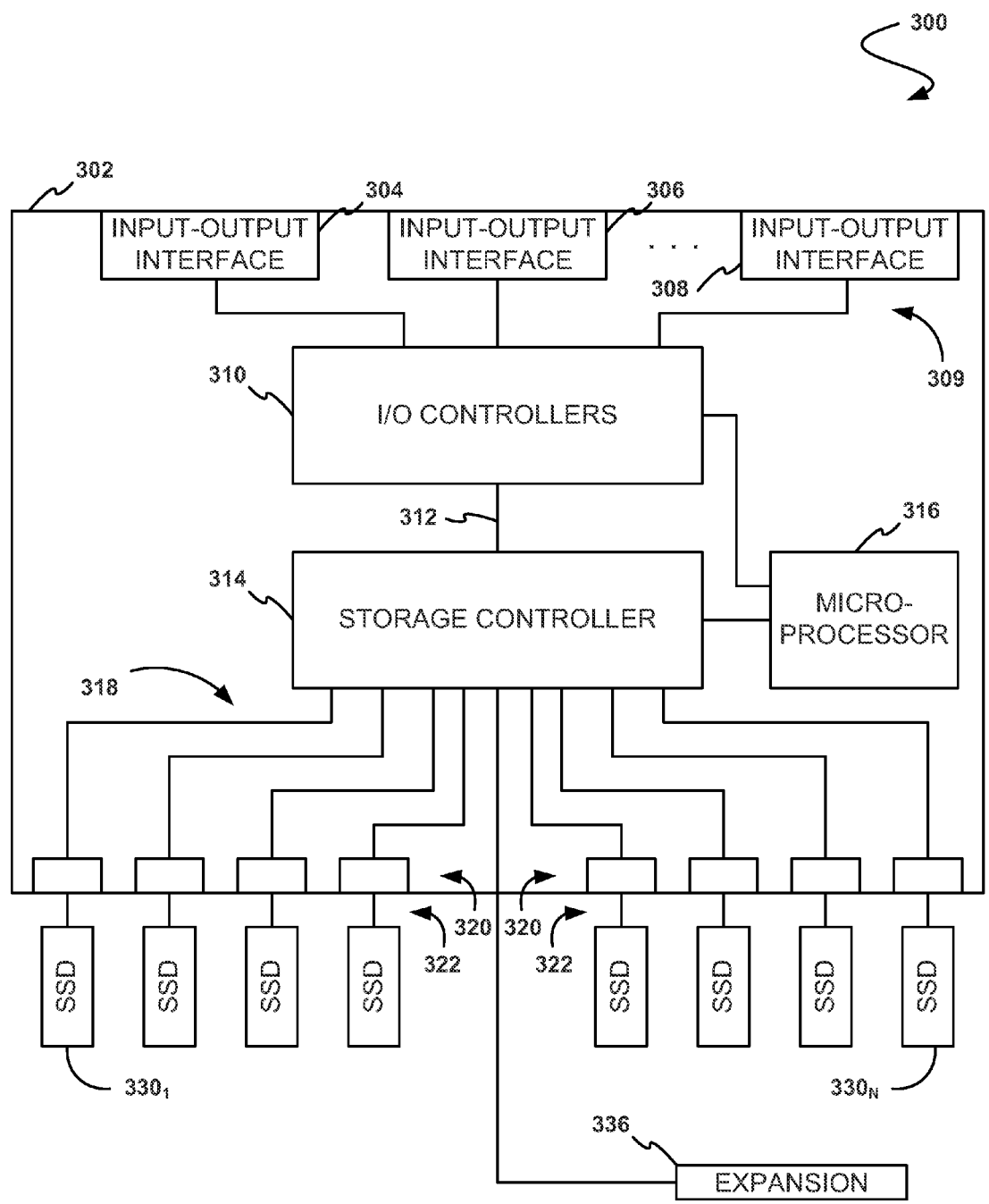
FIG. 3 illustrates an embodiment of a controller card as an exemplary implementation of a solid-state based storage device with multiple interfaces.

FIG. 3 illustrates a system 300 for an interface 118. The exemplary embodiment shown includes a plurality of input-output interfaces, 304, 306, 308, as shown. Each of the plurality of input-output interfaces 304, 306, 308 are in communication with at least one input-output controller 310 adapted for implementation of the specific type or types of input-output carried out over the plurality of interfaces 304, 306, 308. In this embodiment, any known input-output interface may be implemented by the input-output interfaces and input-output controller, and may implement at least two interfaces, including, eSATA, 802.3x, Ethernet, 802.11a, 802.11b, 802.11g, 802.11n, USB, USB 1.x, USB 2.x, IEEE 1394, Firewire™, PCI Express (per PCI-SIG) using internal or external cabling or any other known communication system. One or more of these interfaces 304, 306, 308 may be enabled or disabled at any time. Or, one or more connections, whether physical or logical connections may be concurrently enabled at any time. With respect to wireless interfaces (e.g. 802.11x) the encryption security may be enabled or disabled.

The signals 309 are carried out over connections (whether physical connections or logical connections) to and from input-output controller 310 and to and from the plurality of interfaces 304. The input-output controller serves to implement aspects of the communication protocol including (optionally) aspects of the data link, network layer, transport layer, session layer, presentation layer, application layer, and/or aspects of routing protocols. Moreover, the input-output controller 310 is adapted to communicate over signals 312 to at least one storage controller 314.

Strictly as an option, the controller 302 may implement a processor 316 separate from the input-output controller 310 and storage controller 314. Such a processor 316, if present may be in communication with the input-output controller 310 and/or the storage controller 314. To the extent that the aforementioned aspects of the communication protocol are not implemented by the input-output interfaces 304, 306, 308 and/or input-output controllers 310, the processor 316 may be employed to implement aspects of the protocol. Examples of the input-output protocol may include network attached storage (NAS) and/or internet small computer storage interface (iSCSI). Additionally, to the extent that the aforementioned aspects of the communication protocol are not implemented by the input-output interfaces and/or input-output controllers 310, the processor 316 may implement or emulate some of all aspects of CIFS or NTFS, or NFS or any other file system.

Strictly as an option, the controller 302 may implement a processor 316 separate from the input-output controller 310 and storage controller 314. Such a processor 316, if present may be in communication with the input-output controller 310 and/or the storage controller 314. To the extent that the aforementioned aspects of the communication protocol are not implemented by the input-output interfaces 304, 306, 308 and/or input-output controllers 310, the processor 316 may be employed to implement some or all aspects of a variety of storage applications. Strictly as an option the controller 302 may be implemented as collection of discrete components combined on a carrier, or may be implemented as a single semiconductor platform. It should be noted that the term single semiconductor platform may also refer to multi-chip modules. Of course, the various modules may also be situated separately or in various combinations of semiconductor platforms or carriers.

In the specific case of implementation of aspects of a variety of storage applications via execution of software or firmware in or on the storage controller 314 and/or in or on the processor 316, the controller 314 and/or the processor 316 serves to communicate with client agent 114 to carry out the aforementioned aspects of a variety of storage applications.

One or more storage controller(s) 314 is capable of running in non RAID and RAID mode with different levels (0, 1, 3, 5, 6, 10), and interfaces to at least one SSD interface 320 over signals 318. In some implementations there will be exactly one SSD interface 320. In other implementations, there may be more than one SSD interfaces 320. In preferred embodiments the number of SSD interfaces is defined by the specific RAID configuration implemented The elements $330_1$ through $330_n$ as shown in the exemplary embodiment of FIG. 3 are solid-state storage devices (SSD) and are individually in communication to an interface 320 over signals 322. The SSDs $330_1$ through $330_n$ may all be identical instances of the same SSD, or they may be arbitrarily sized and configured, so long as they properly conform to the interface characteristics of the corresponding interface 320. As an option, the storage controller 314 may communicate with an expansion port 336 for provision of storage capacity in addition to the storage capacity of SSDs $330_1$ through $330_n$.

Figure 4:
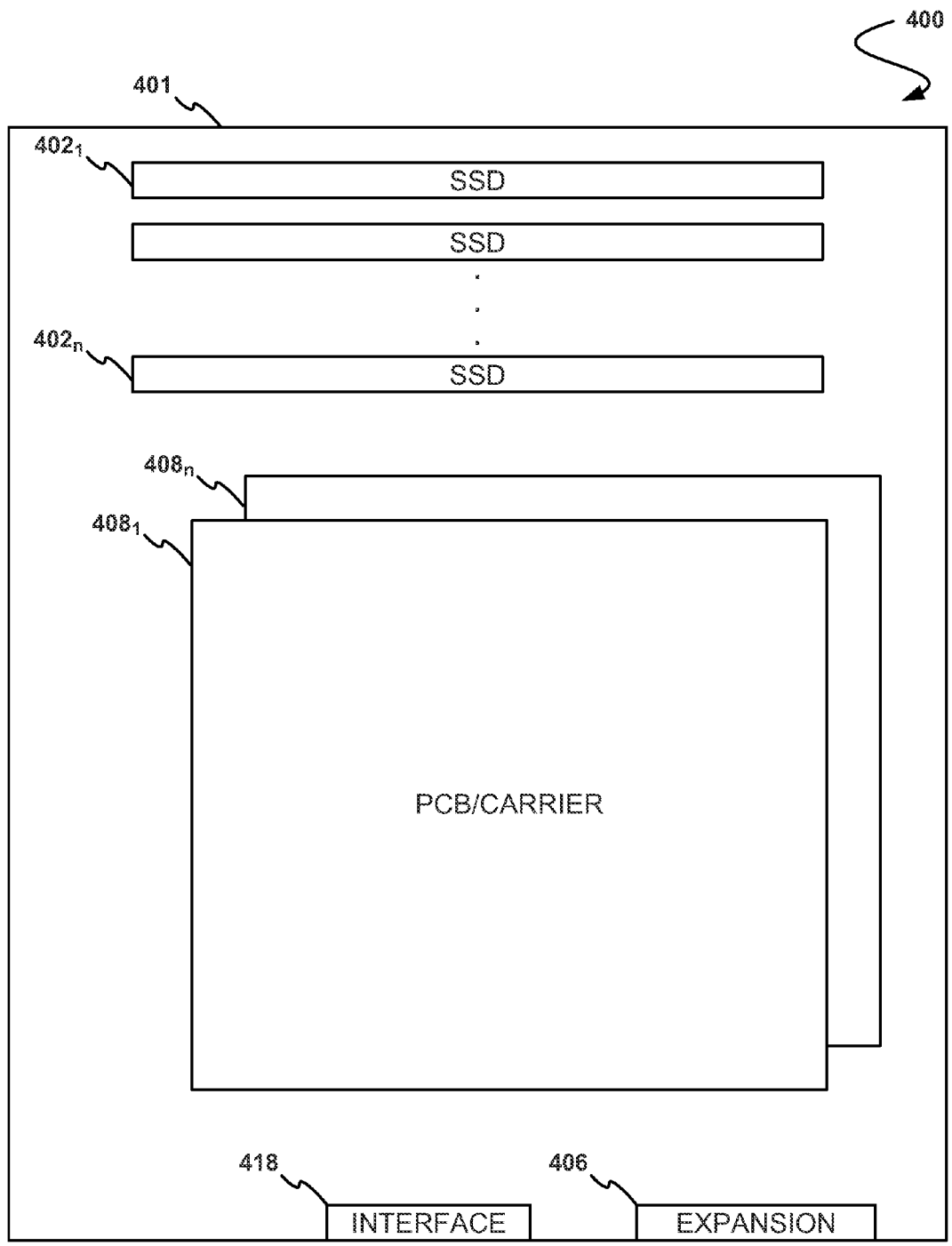
FIG. 4 illustrates exemplary configurations of an apparatus for providing a solid-state based storage device, according to one embodiment.

FIG. 4 shows a possible configuration of a storage enclosure. The free-standing storage enclosure shown in FIG. 4 is strictly an option, and other embodiments of a solid-state based storage device are not only possible, but also disclosed herein. The system 400 includes a free-standing enclosure 401, and further includes at least one interface 418. In some configurations, of the enclosure 401, the enclosure is adapted with one or more bays which conform to all mechanical, electrical, and other requirements to comport with the SATA2 hard disk carrier form factor. See element $402_1$ through $402_n$. Strictly as an option, one or more of such bays, or bays of a form factor other than SATA2 hard disk carrier form factor are populated with one or more SSD devices. It must be emphasized that the form factor of any existing or prophetic SSD device may be (either individually or in some physical combination) of a different size than the devices intended to populate the SATA2 bay; accordingly, an arbitrary number of SSD devices can be arranged, connected, mounted, stacked, or otherwise adapted to fit into the bays $402_1$ through $402_n$. As an alternative embodiment, the enclosure 401 might be electrically and mechanically designed to fit into a handheld consumer device (e.g. digitial camera, smartphone, handheld game console), in which case the interface 418 might be a Compact Flash interface, a SATA interface, a PCI-Express interface, an ATA interface, an IDE interface, or even a wireless interface adapted for memory accesses.

The system 400 may be adapted with one or more bays which conform to any mechanical, electrical, and other requirements to comport with the drive form-factors other than a SATA form-factor.

Strictly as an option the method of 400 or other embodiments discussed herein may include an expansion interface 406 suited to comport to one or more storage device standards, including SATA, SATA2, wired Ethernet including gigabit Ethernet and 10 gigabit Ethernet. As an option, this expansion interface 406 is provided to permit expansion of storage capacity using storage devices attached to the expansion interface 406. Alternatively, expansion 406 might be a port of the same (or different) type as the interface 418, and be adapted for memory capacity or performance expansion.

In some embodiments of a solid-state based storage device, the enclosure may contain one or more printed circuit boards (PCBs), daughter-cards, sub-chassis, carriers $408_1$ through $408_n$ designed or adapted to provide a physical mounting as well as electrical connectivity with, and to, and from any components used in elements $402_1$ through $402_n$, 406, and/or interface 418.

As mentioned in the discussion herein regarding FIG. 4, the free-standing chassis embodiment is one of a multitude of possible physical design configurations. In addition to a multitude of free-standing chassis configurations, the solid-state based storage device may be enclosed in other chassis as may be present for enclosure of elements 102, or 104 of FIG. 1A. In fact, inasmuch as the solid-state based storage device of FIG. 2 or FIG. 3, or FIG. 4 can be partitioned, some portion of the solid-state based storage device may be enclosed in one chassis among 102, 104, while the remaining portions may be enclosed in a different chassis.

While FIG. 4 depicts the aspect ratio of a 'tower' enclosure, the enclosure need only be as large as is needed to package the elements of system 300. In one such packaging option, the size and aspect ratio is similar to the size and aspect ratio of a 3.5 inch hard disk drive (HDD). In some cases, strictly as an option the aforementioned package may fit mechanically and electrically into a 3.5 inch HDD bay. Similarly, in one packaging option, the size and aspect ratio is similar to the size and aspect ratio of a 2.5 inch hard disk drive (HDD). In some cases, strictly as an option the aforementioned package may fit mechanically and electrically into a 2.5 inch HDD bay. In yet another embodiment the package may conform to the 3.5 inch or 2.5 inch drive bay physical requirements, and yet be free-standing. In yet another embodiment, the elements of system 300 might be packaged into a form factor only as large as required to house the needed elements.

Figure 6:
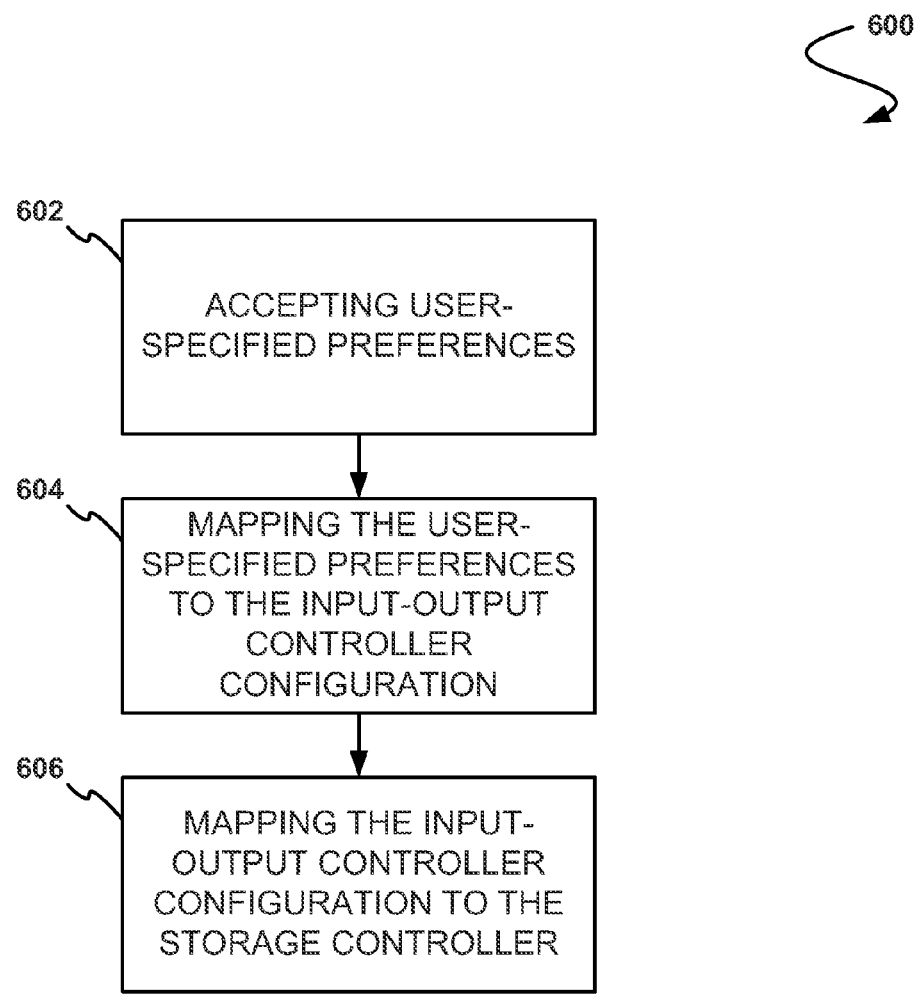
FIG. 6 illustrates a method for configuring a solid-state based storage device, according to one embodiment.

Returning attention to FIG. 3 as is herein disclosed, the input-output controller 310 communicates to and from one or more of the plurality of interfaces 304, 306, 308. Accordingly the input-output controller 310 may implement a method to select from the plurality of interfaces 304, 306, 308. One skilled in the art will recognize that whereas selection of hard-wired interfaces has been traditionally performed using a physical or logical multiplexor, the inclusion of the aforementioned one or more wireless protocols implies that a method to select not only the interfaces from among the plurality of interfaces but possibly also from one or more specific wireless networks that may be reachable over the plurality of interfaces. Accordingly the method 600 of FIG. 6 is herein disclosed.

Figure 5:
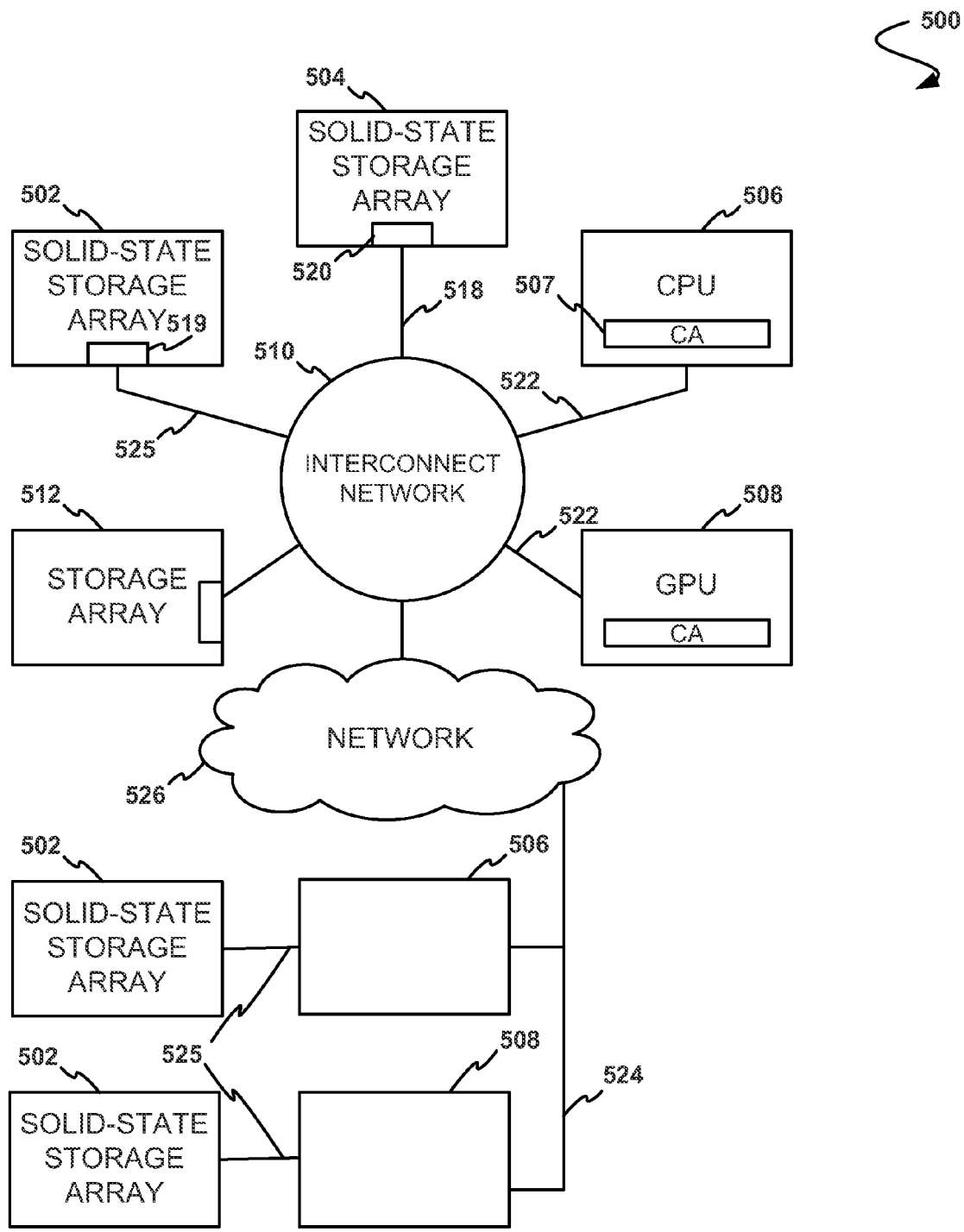
FIG. 5 illustrates a block diagram of an embodiment of a networked environment wherein an apparatus for providing a solid-state based storage device with multiple interfaces might be used.

FIG. 5 illustrates an environment wherein an apparatus for providing a solid-state based storage device with multiple interfaces might be used. In this exemplary network topology, one or more solid-state based storage devices 502 and 504 are in communication with one or more CPUs 506 or GPUs 508 or other computing subsystem such as a server, or personal computer or any variety of handheld consumer devices. Such a personal computer or server or CPU 506 or GPU 508 contains a client agent 507 capable to handle at least one function involved in the communication carried out over the path 522. In some environments, the one or more CPUs 506 or GPUs 508 may optionally be connected to network 526. Further, in some environments, the one or more CPUs 506 or GPUs 508 may optionally be connected to storage device 502 via connection 525 which is distinct from the network connection 524.

The interconnect fabric 510 may operate to execute multiple physical layers, multiple link layers, multiple protocols and multiple modes of session management. In the embodiment shown, a storage device 502 may be in communication through an interconnect network 510 via an interface 520 using a connection 518. As shown, concurrently a second or Nth solid-state based storage device 504 may be in. communication through an interconnect network 510 via an interface 519 using a connection 525. Strictly as an option, yet another storage apparatus 512 which may not be a solid-state based storage array may be present in the environment.

In one embodiment plural solid-state based storage devices may be present and used as at least two nodes in said network topology. Strictly as an option, a network topology with plural solid-state based storage devices may implement secondary backup storage discussed infra. Moreover, the solid-state based storage device may be shared by one or multiple users as primary, backup, or as secondary backup storage, or as media storage, or as shared storage of any type of data or media files.

FIG. 6 depicts a method to select a subset of user-specified interfaces from a plurality of possible interfaces. Specifically, the method 600 begins by accepting user-specified preferences. See operation 602. The operation 602 may employ one or more techniques, including use of a profile, use of a GUI, use of an import filter, or use model heuristics, and/or use of any known technique to confirm with or derive from the user the user's preferences. The method 600 continues by mapping the user preferences to the available input-output interfaces, resulting in an input-out controller configuration. See operation 604. Next, the resulting input-output controller configuration is mapped to the available storage controller configurations. That is, the operation 606 operates by mapping the input-output controller configuration result of operation 604 to the storage controller.

Some examples of the operation 602 may include accepting user-specified preferences from a GUI or configuration file. In some embodiments, a configuration file with default values of settings and preferences is provided and may or may not be modified by the user. Specific cases of user-specified input may include user selection of the location for primary storage, search characteristics for tags in an OSD configuration, tag creation options, selection of adaptive tagging options, option selection for capturing specific media types in specific OSD formats, etc. In this case, the default preference may be to move or otherwise store data found on any local storage device to the SSD, and henceforth use the SSD as primary storage. Another user selection may include options for backup. More specifically, through strictly as an option, the user may specify a variety of backup configuration options, including what data to backup, the frequency of backup, the naming conventions to be used in naming backed-up data, and the specific target location on one or more SSDs. Another option is that the SSD storage device may utilized for media sharing and being accessed by multiple users (CPU or GPU based) via a network. In this case any user can utilize the device as primary, back-up, or secondary storage. In exemplary cases involving more than one SSD storage device volumes, operation 602 captures user options regarding secondary backup storage where a second or nth copy of backed-up data is stored on one of more secondary SSD storage device volumes. Of course a secondary SSD storage device volume may include multiple SSDs, or it may include multiple SSD storage arrays, or it may merely include a directory or other file on a single SSD.

Figure 7:
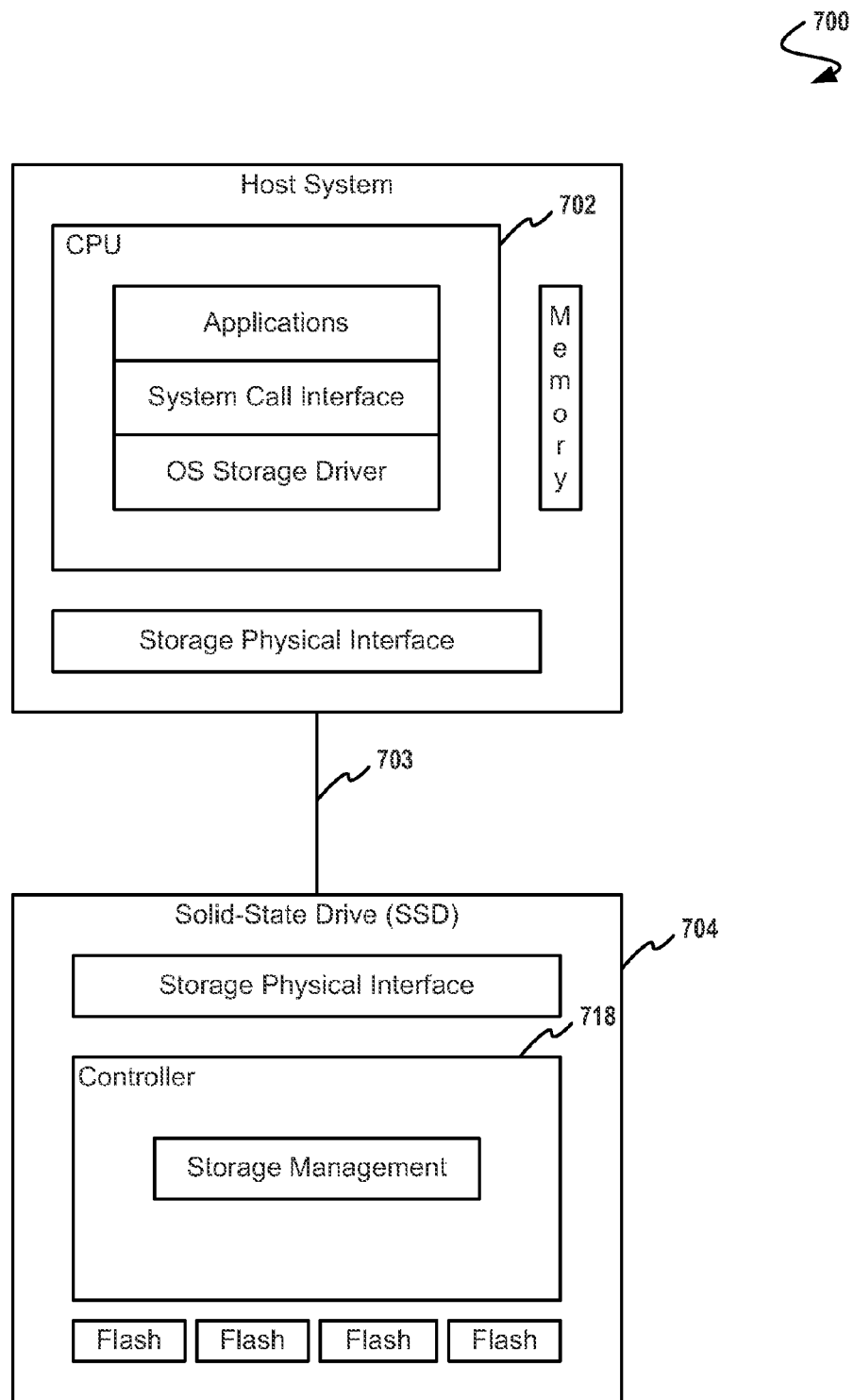
FIG. 7 depicts a storage subsystem connected to a host, according to one embodiment.

FIG. 7 shows a conventional solid-state based storage device 704 connected to a host system 701 via a storage physical layer interface 703. Generally speaking, conventional solid-state based storage devices employ a controller for processing algorithms for physical storage device management (e.g. wear-leveling) 718. Also, conventional solid-state based storage devices contain one or more solid-state non-volatile memory devices (e.g. NAND or other flash memory devices).

Figure 8:
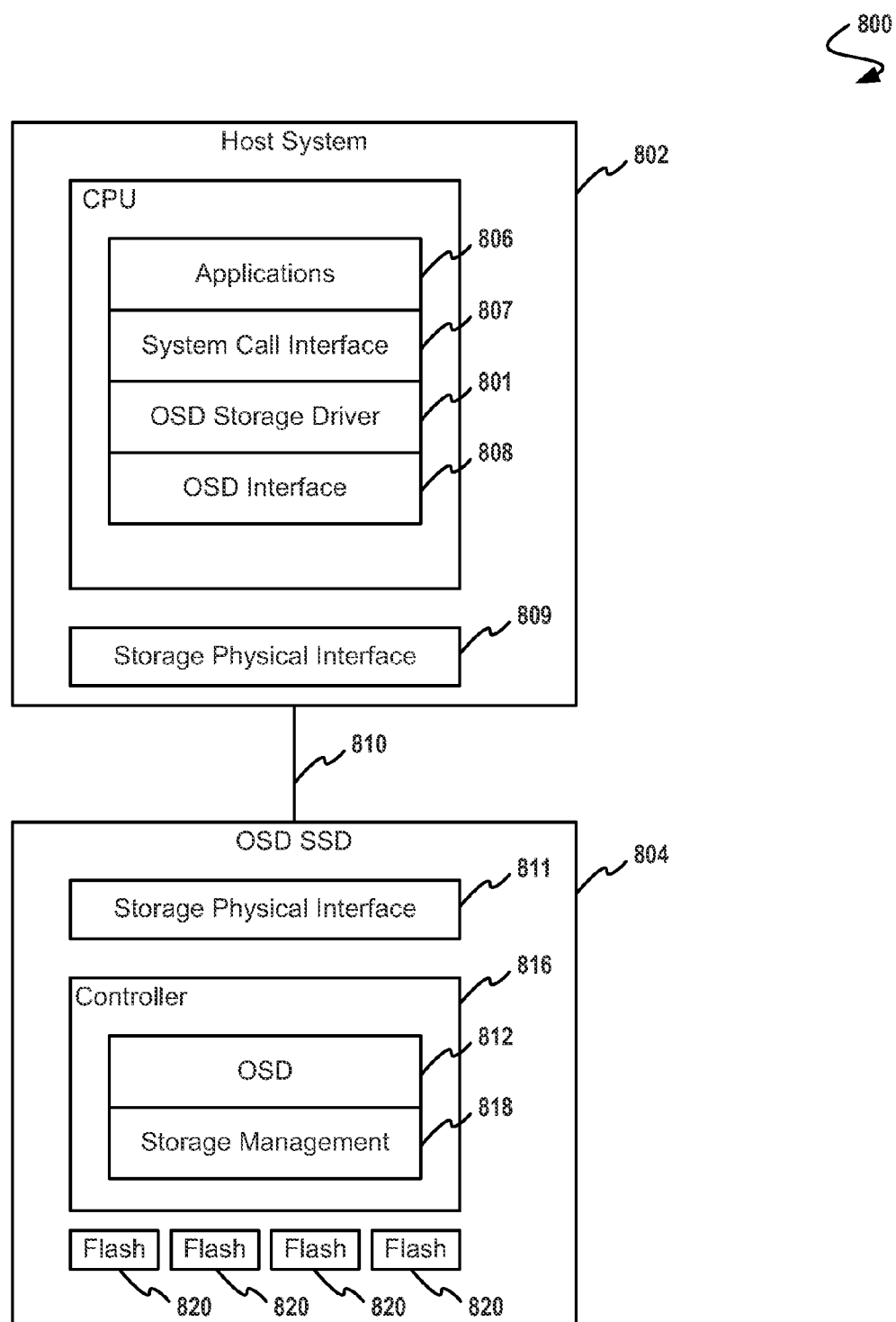
FIG. 8 depicts an exemplary configuration of an object-based, solid-state based storage device, according to one embodiment.

FIG. 8 shows a method 800 including a host system 802 which employs a partition for executing applications 806, a system call interface 807, an OSD storage driver 801, an OSD call interface 808, and an inter-system physical layer interface 809 (e.g. SATA, SAS, PATA, Fibre-channel, SCSI, IDE, etc.) for communicating to/from an OSD-SSD 804 over an inter-system communication media 810 (e.g. copper wire, fibre, or wireless media). The OSD-SSD in turn comprises a storage physical interface communication link 811, a control module capable of processing algorithms for OSD 812 combined with processing of physical storage device management algorithms 818, and at least one group of solid-state non-volatile memory devices 820.

In embodiments, the OSD-SSD controller (812) may be a uniprocessor or a multi-processor; in particular, the OSD algorithms and physical storage device management algorithms are adapted to execute on the same control processor or processors 816. In one embodiment, the OSD algorithms perform the storage management component which maps logical constructs (e.g. files or database entries) to the physical organization of the storage media. In the OSD model, the logical constructs are called user objects. In addition to mapping data, the storage management component maintains other information about the OSD objects that it stores (e.g. size, and usage quotas, and associated user-name) in attributes. The user component may have the ability to influence the properties of object data through the specification of attributes (e.g. directing that the location of an object be in close proximity to another object or have some higher performance characteristic) via mechanisms that are known in the art.

In other embodiments the OSD algorithms operate on the data or the protocol for communicating or processing data so as to implement mapping functions, storage functions, meta-data definitions, assignment and storage functions, and user-specific functions. In fact, in some embodiments the OSD algorithms are known only by a code that maps to a specific implementation; for example a code of value "xyz123" might be redirected to an algorithm available via internet access at an address such as http://abc.osdalgorithms/xyz123.

Of course, an OSD algorithm may be implemented in a single processor, or in multiple processors, or may even be implemented in multiple processors situated in different subsystems in communication with each other across the inter-system media communication link 810.

In some embodiments, the partition for executing applications 806 may be a logical partition of an operating system such as user space, or it may be a combination of partitions of an operating system including both user space and kernel space. In other embodiments, the partition may itself be a processor or controller, or a plurality of processors or controllers. The partition as envisioned in various embodiments may be strictly a virtual construction, and may in fact be comprised of any combination of logical partitions and physical partitions, possibly involving any number of processors or controllers.

The system call interface 807 of FIG. 8 may be the system interface as delivered in any version of any known operating system, including any version or descendant of Microsoft Windows, any version or descendant of UNIX or any version or descendant of Linux, or of any embedded operating system, whether commercially available or not.

The OSD interface 808 is adapted to interface to the system call interface 807 as well as the OSD interface 808 and further, as an implementation choice may be adapted to interface with the storage physical interface 809. In embodiments, the OSD interface 808 may merely transmit commands or information between the system call interface 807 and the storage physical interface 809, or it may operate on the information before passing those commands or information.

The storage physical interface 811 may include any generation of SATA, SAS, PATA, Fibre-channel, SCSI, IDE, Compact Flash, PCI-Express, or even USB, IEEE, FireWire, Ethernet, Gigabit Ethernet, or any serial or parallel physical interface capable of transmission over electrically conductive media or over light transmitting media or even over a wireless medium, possibly using any one or more wireless standards (e.g. Bluetooth, 802.11, Wi-Fi, WiMAX, etc).

In various embodiments, the inter-system physical layer interface communication link 810 may be identical to the storage physical interface 811, or the inter-system physical layer interface communication link 810 may include any combination of implementations of storage physical interface 811, or may include the use of other techniques for inter-system connectivity.

The control module is capable of processing algorithms for the OSD 812. The algorithms may be adapted to make use of any OSD formats, or of any portion or subset of the standard known as T10-OSD protocol format, also known as the OSD T10-standard, and heretofore known by such aliases including the shortened form, T10-OSD. Moreover, any portion or combination of components or functions of the OSD-SSD 804 and/or the host 802 may be fully or partially T10-OSD compliant.

The solid-state non-volatile memory devices 820 may be implemented in various embodiments such as flash storage, or it may be implemented using any known method for providing a non-volatile capability to any digital storage device or media. Actual embodiments and envisioned embodiments include support for a wide range of storage media, including NAND flash (all variants expressly including MLC and SLC) and other non-volatile memory, regardless of the SSD technology employed and regardless of if the non-volatile characteristic is implemented using the charged gate technique or other techniques such as battery-powered semiconductor memory.

In exemplary embodiments, the OSD-SSD may employ a controller 816 that is an embedded controller, a uniprocessor, or the controller 816 may be implemented as a multi-processor array of loosely- or tightly-coupled processors.

Once the host system and OSD-SSD are initialized, any command set per the T10-OSD specifications may be executed (e.g. READ and WRITE). As an option (but not a requirement or limitation), the READ command requests that the device server return data to the application client from the specified user object, and the WRITE command causes the specified number of bytes to be written to the specified user object at the specified relative location. In other embodiments, and indeed in normal operation of exemplary embodiments, the READ and WRITE commands may take on any other variations as are known in the art.

It is observed that for a broad class of stored objects, the object is written and thence retrieved, or searched, or filtered, or used in a join operation or in a projection, or used in any other manner in queries many times. The asymmetric characteristic therein is known as asymmetric storage object access. As will be readily recognized by those skilled in the art, the apparatus and methods herein described support asymmetric storage object access. In various embodiments, this asymmetry is exploited in processing of video files, music files, database files, emails, forms, and virtually any type of file intended to be retrieved multiple times on the basis of some criteria capable of being formulated into a query. Stated in other terms, the act of writing a storage object may include pre-processing the file to produce tags, the tags then being formatted as part of the object (including the data of file), and the act of reading the object (or group of objects) may include retrieval on the basis of querying the tags or metadata or other aspects associated with the object (or group of objects).

Figure 9:
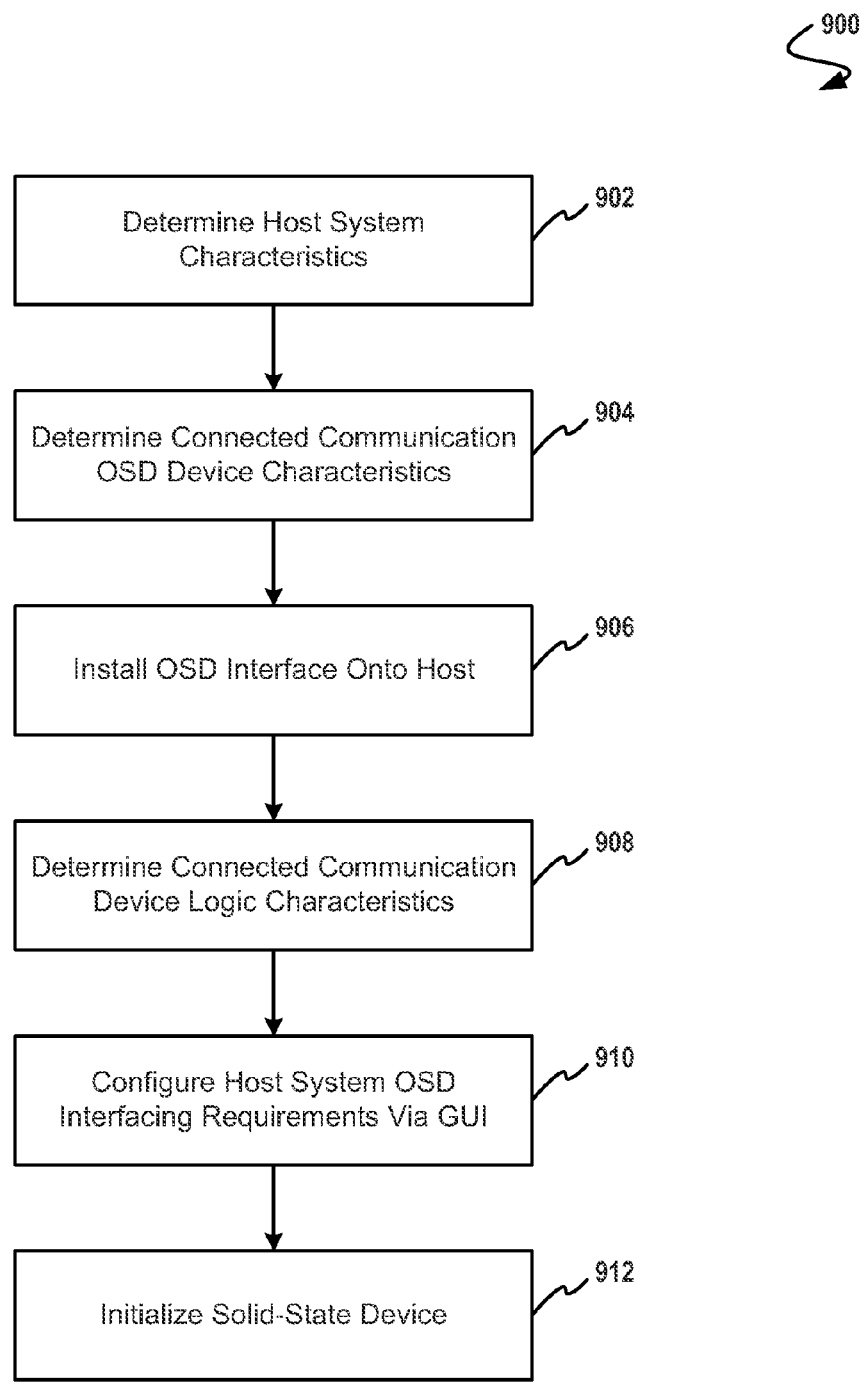
FIG. 9 illustrates a method for configuring a solid-state based storage device, according to one embodiment.

FIG. 9 shows one embodiment of a method for initializing a device for use in object-based storage. Using any computer coding techniques, the method for configuring an object-based storage device onto a host processor might comprise steps for determining the host system characteristics (see operation 902); determining connected communication OSD device characteristics (see operation 904); installing at least one OSD interface onto the host (see operation 906); determining connected communication device logical characteristics (see operation 908); configuring OSD interfacing requirements, possibly with user-specified configurations parameters, and possibly interactively with a user through a computer-user interface such as a GUI (see operation 910); and initializing solid state devices (see operation 912). Of course the steps included in system 900 can be performed in any particular order, or even in parallel, or even some in parallel and some serially.

Of course the steps for determining host system characteristics might be performed by an instance of a CPU on the host system 802, and more specifically by any one or more software code segments for an OSD interface 808, an OSD storage driver 801, any part of a system call interface 807 or transaction therethrough, or even from one or more applications running on host system 802. Alternatively, or in combination with the foregoing host-based components (808, 801, 807, 806), one embodiment of a method for initializing a device for use in object-based storage might include software code for an OSD interface that resides on an OSD-SSD device 804, including any one or more hierarchical blocks 811 or 816, or even in conjunction with code or interfaces incorporated into flash devices 820.

Figure 10:
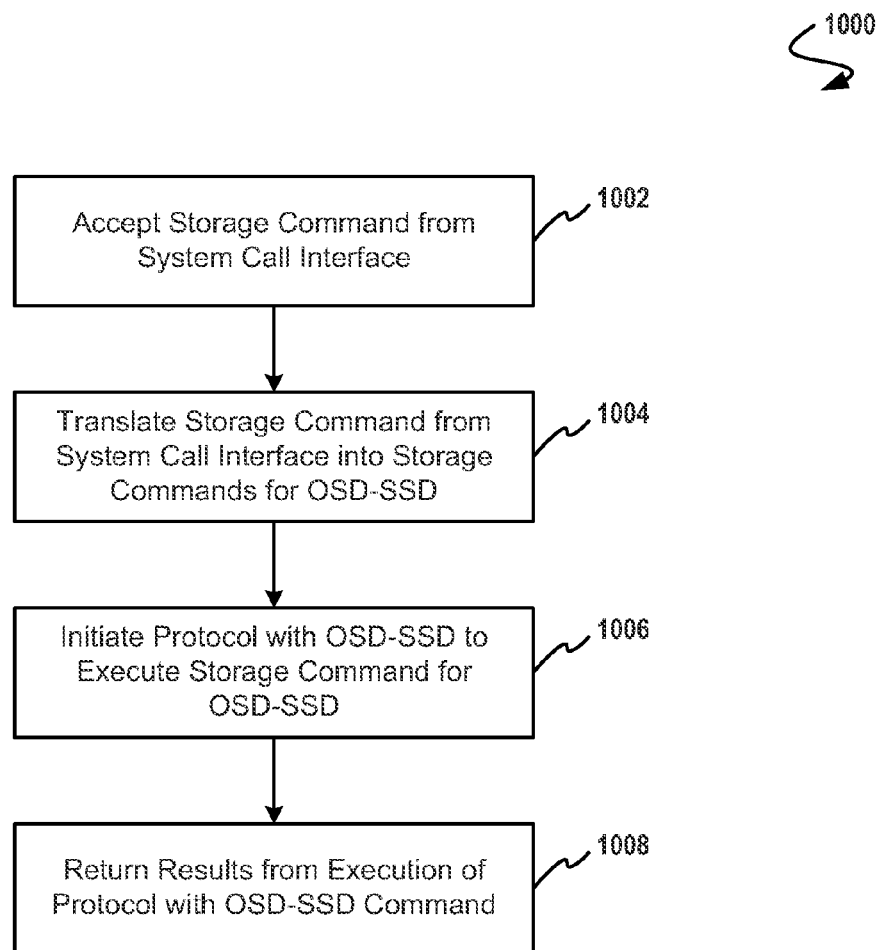
FIG. 10 illustrates a method for executing a command to an object-based storage device, according to one embodiment.

In fact, it is reasonable, envisioned, and exemplified in FIG. 10 that code or interface hardware residing on the OSD-SSD 804 might be configured for accepting storage commands from a system call interface (see operation 1002) of a host 802, translating storage commands from the host into storage commands for an OSD-SSD device (see operation 1004), initiating a second communication protocol between the host and the OSD-SSD (see operation 1006), and communicating results from execution of the second protocol (see operation 1008) to the host 802. In some cases, translation of a storage command (or a combination of storage commands) from the host into storage commands for an OSD-SSD device might include translating onto a different protocol, and such a different protocol might in turn include expansion of a single protocol command into multiple protocol commands. Similarly, any module capable of performing the operation 1004 might receive multiple storage commands from the host into fewer storage commands, or even a single storage command for an OSD-SSD device.

In another embodiment, the method 1000 for initializing a device for use in object-based storage might be employed to adapt legacy storage devices to accept OSD commands. In particular, an OSD device might be constructed by using a legacy device capable of responding to commands over the inter-system communication link media 810. In generalized cases, modifications might be made to such a legacy device in the form of software modification, or hardware modification to a storage physical interface 811, or modification to a controller 816 to include ODS-specific command handlers, and/or modification to one or more members of the non-volatile storage device 820.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

I claim:

1. A system for processing, under direction by a host, object storage device (OSD) commands, over storage media that is stored on a storage device, the system comprising:
    an input-output controller to interface between the storage device and the host;
    at least one solid-state non-volatile memory device (SSD) to store at least one user object, wherein the user object comprises a logical construct being at least one of, a file or one or more database entries; and
    a processor, configured to execute a set of wear-leveling algorithms interleaved with one or more object storage device algorithms, at least one of the one or more object storage device algorithms being identified by a code value that maps to an internet address location where the object storage device algorithm resides;
    wherein the processor is further configured to:
        translate at least one storage command from the host into one or more commands to execute on the at least one user object using the one or more object storage device algorithms;
        retrieve, using the code value that maps to the internet address location, the one or more object storage device algorithms; and to
        execute the one or more object storage device algorithms to map the at least one logical construct of the user object to a physical aspect of the storage media.

2. The system of claim 1, wherein the system comprises a consumer device employing a non-volatile memory.

3. The system of claim 1, wherein the input-output controller comprises encryption security.

4. The system of claim 1, wherein the solid-state non-volatile memory device (SSD) comprises a plurality of non-volatile memory arrays.

5. The system of claim 4, wherein the plurality of non-volatile memory arrays are configured for at least one of, RAID level 0, RAID level 1, RAID level 3, RAID level 5, RAID level 6, RAID level 10.

6. The system of claim 1, further comprising the host, the host configured to execute code in a partition for executing code.

7. The system of claim 1, wherein the input-output controller is configured to process communications over at least one of, USB or IEEE 1394.

8. The system of claim 1, wherein input-output controller is configured to process communications over at least two of, USB, IEEE 1394, SATA1, SATA2, IDE, ATA, eSATA, SAS, PCI-Express, Compact Flash.

9. The system of claim 1, wherein the at least one solid-state non-volatile memory device comprises at least two solid-state non-volatile memory device arrays.

10. The system of claim 9, wherein the at least two solid-state non-volatile memory device arrays are configured for at least one of, RAID level 0, RAID level 1, RAID level 3, RAID level 5, RAID level 6, RAID level 10.

11. The system of claim 1, wherein input-output controller comprises an interface to serve as a primary storage device to at least one of, a personal computer, a server, a handheld device, a mobile device, a game console, a DVR, an NVR, a PVR, a media server, a notebook computer.

12. The system of claim 1, wherein input-output controller comprises an interface to serve as a back-up storage device to at least one of, a personal computer, a server, a handheld device, a mobile device, a game console, a DVR, an NVR, a PVR, a media server, a notebook computer.

13. The system of claim 1, wherein the at least one solid-state non-volatile memory device includes a flash memory device.

14. The system of claim 1, wherein the internet address location is an http address.

15. The system of claim 14, wherein the internet address location maps to a specific implementation of the at least one of the set of one or more algorithms.

16. The system of claim 1 wherein the at least one solid-state non-volatile memory device comprises a plurality of one or more shared memory devices, the shared memory devices configured to be usable by multiple users as primary storage, backup storage, or media storage.

17. A system for processing, under direction by a host, object storage device (OSD) commands, over storage media that is stored on a storage device, the system comprising:
   an input-output controller to interface between the storage device and the host;
   at least one solid-state non-volatile memory device (SSD) to store at least one user object, wherein the user object comprises a logical construct being at least one of, a file or one or more database entries; and
   two or more processors, the processors configured to execute a set of wear-leveling algorithms interleaved with one or more object storage device algorithms, at least one of the one or more object storage device algorithms being identified by a code value that maps to an internet address location where the object storage device algorithm resides;
   wherein at least one of the two or more processors is further configured to:
      translate at least one storage command from the host into one or more commands to execute on the at least one user object using the one or more object storage device algorithms; and
      retrieve, using the code value that maps to the internet address location, the object storage device algorithms; and to
      execute the one or more object storage device algorithms to map the at least one logical construct of the user object to a physical aspect of the storage media.

18. The system of claim 17, wherein the system comprises a consumer device employing a non-volatile memory.

19. The system of claim 1, wherein at least one of the one or more object storage device algorithms formats tags.

20. The system of claim 1 wherein the storage command from the host comprises an asymmetric storage object access command.

21. The system of claim 20, wherein the asymmetric storage object access command serves to accesses one or more files selected from at least one of, a video file, or one or more music files, or one or more database files, or one or more emails, or one of more form files, or any combination thereof.

22. The system of claim 21, wherein the one or more files is pre-processed to produce one or more tags.

23. The system of claim 22, wherein the one or more tags are formatted into an object further comprising data of the one or more files.

24. The system of claim 20, wherein the asymmetric storage object access command is formulated into a query.

25. The system of claim 1, further comprising an SSD controller.

26. The system of claim 25, wherein the SSD controller implements one or more command handlers.

27. The system of claim 26, wherein the command handlers serve to handle a READ command or a WRITE command.

28. The system of claim 26, wherein the command handlers serve to handle a query.

29. The system of claim 1, wherein the object storage device algorithms operate on data to implement any one or more of, a mapping function, or a metadata function, or an assignment function, or a user-specific function, or any combination thereof.

30. The system of claim 1, wherein the object storage device algorithms implement a protocol for communicating any one or more of, a mapping function, or a metadata function, or an assignment function, or a user-specific function, or any combination thereof.

31. The system of claim 1, wherein the processor further processes a user component to specify attributes of the properties of the user object.

32. The system of claim 1, wherein the user object is associated with at least one of, one or more object properties, or one or more object attributes.

33. The system of claim 32, wherein the object properties of the user object comprises a specification that the user object is to be stored in close proximity to another object.

34. The system of claim 32, wherein the object properties of the user object comprises a specification of a performance characteristic.

* * * * *